US012630698B2

(12) United States Patent
Sekiya et al.

(10) Patent No.: US 12,630,698 B2
(45) Date of Patent: May 19, 2026

(54) ETHYLENE RESIN COMPOSITION AND FILM

(71) Applicant: PRIME POLYMER CO., LTD., Tokyo (JP)

(72) Inventors: Keiko Sekiya, Sodegaura (JP); Masao Suzuki, Chiba (JP); Yuta Kudo, Ichihara (JP)

(73) Assignee: PRIME POLYMER CO., LTD., Tokyo (JP)

( * ) Notice: Subject to any disclaimer, the term of this patent is extended or adjusted under 35 U.S.C. 154(b) by 655 days.

(21) Appl. No.: 17/911,593

(22) PCT Filed: Mar. 30, 2021

(86) PCT No.: PCT/JP2021/013614
§ 371 (c)(1),
(2) Date: Sep. 14, 2022

(87) PCT Pub. No.: WO2021/200991
PCT Pub. Date: Oct. 7, 2021

(65) Prior Publication Data
US 2023/0119372 A1      Apr. 20, 2023

(30) Foreign Application Priority Data

Mar. 31, 2020    (JP) ................................. 2020-065433

(51) Int. Cl.
C08L 23/0807        (2025.01)
C08F 10/02          (2006.01)
(Continued)

(52) U.S. Cl.
CPC .......... C08L 23/0815 (2013.01); C08F 10/02 (2013.01); C08F 210/02 (2013.01); C08J 5/18 (2013.01); *C08L 2203/16* (2013.01)

(58) Field of Classification Search
CPC ............ C08L 23/04–0892; C08F 10/02; C08F 110/02; C08F 210/02; C08F 210/16
See application file for complete search history.

(56) References Cited

U.S. PATENT DOCUMENTS 4,729,926 A * 3/1988 Koteles ................... B29C 48/08
                                                           428/476.3
6,117,465 A * 9/2000 Falla ....................... B32B 27/18
                                                           426/127
(Continued)

FOREIGN PATENT DOCUMENTS

CA        2835740 A1 * 6/2014    ................ C08J 5/18
GB        2097324 A  * 11/1982   ........... B29C 61/003
(Continued)

OTHER PUBLICATIONS

Kono, Akihiko et al., "Relationship between Crystallinity of Linear Low-Density Polyethylene (LLDPE) and Resistivity-Temperature Property of the LLDPE/Ni Composites" Kobunshi Rondunshu (Japanese Journal of Polymer Science ant Technology), 2010, vol. 67, pp. 296-303.

*Primary Examiner* — Kregg T Brooks
(74) *Attorney, Agent, or Firm* — Foley & Lardner LLP

(57) ABSTRACT

An ethylene-based resin composition having the following requirements (1) to (4) as a material such as packaging material, a film having strength for the protection and rigidity (e.g., easy opening and self-standability on packaging contents) in an excellent balance: (1) A melt flow rate (190° C., 2.16 kg load) is 0.1 g/10 min or more and 1.0 g/10 min or less, (2) a density is 915 kg/m³ or more and 935 kg/m³ or less, (3) a melt index (I21: 190° C., 21.6 kg load) is 45 or less, and (4) a ratio of the amount of heat of fusion at 120° C. or higher (Hh/Ht), which is the ratio of the amount of heat of fusion (Hh) determined from a DSC curve at 120° C. or higher to the total amount of heat of fusion (Ht)

(Continued)

determined from a DSC curve of DSC measurement, is 10%
or more and 55% or less.

4 Claims, 1 Drawing Sheet

(51) Int. Cl.
*C08F 210/02* (2006.01)
*C08J 5/18* (2006.01)

(56) References Cited

U.S. PATENT DOCUMENTS

| | | | | |
|---|---|---|---|---|
| 10,239,976 | B2 | 3/2019 | Goyal et al. | |
| 11,053,332 | B2 | 7/2021 | Goyal et al. | |
| 2004/0121098 | A1 * | 6/2004 | Maziers | B32B 1/00 |
| | | | | 428/35.7 |
| 2004/0167286 | A1 * | 8/2004 | Chum | C08J 5/18 |
| | | | | 525/240 |
| 2009/0155430 | A1 * | 6/2009 | Lee | A22C 13/0013 |
| | | | | 427/372.2 |
| 2017/0233512 | A1 | 8/2017 | Goyal et al. | |
| 2019/0161569 | A1 | 5/2019 | Goyal et al. | |

FOREIGN PATENT DOCUMENTS

| | | | |
|---|---|---|---|
| JP | 2009-096119 A | 5/2009 | |
| JP | 2017-527662 A | 9/2017 | |
| JP | 2018-070248 A | 5/2018 | |
| JP | 2018-154803 A | 10/2018 | |
| WO | WO-9855546 A1 * | 12/1998 | C08F 210/02 |

* cited by examiner

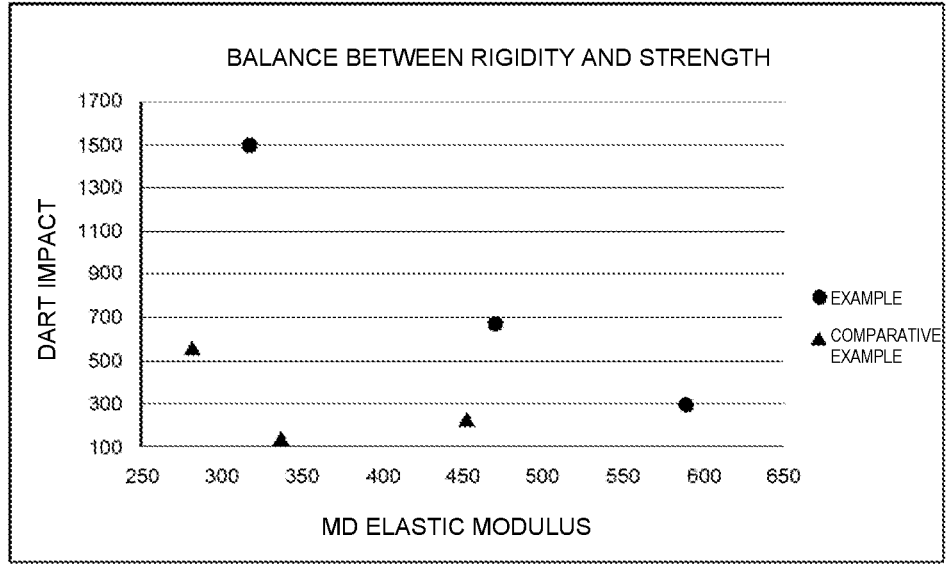

ETHYLENE RESIN COMPOSITION AND FILM

CROSS-REFERENCE TO RELATED APPLICATIONS

The present application claims priority under 37 U.S.C. § 371 to International Patent Application No. PCT/JP2021/013614, filed Mar. 30, 2021, which claims priority to and the benefit of Japanese Patent Application No. 2020-065433, filed on Mar. 31, 2020. The contents of these applications are hereby incorporated by reference in their entireties.

TECHNICAL FIELD

The present invention relates to an ethylene-based resin composition and a film containing the resin composition.

BACKGROUND ART

Films made of polyethylene have been used as packaging bags for food, confectionery, snack, drug, etc., and packaging materials for use in packaging containers such as a standing pouch and a tube.

For manufacturing such films made of polyethylene, a method in which a material including an extruded ethylene-based resin composition is non-stretch-formed or stretch-formed has been used. Examples of typical forming methods include an inflation method and a T-die method (also referred to as a casting method). As a method for manufacturing a thin film using an inflation method, there is a known method in which air is blown into the inside of an extruded cylindrical formed article so that the article is expanded and thinned, and the thus-obtained cylindrical formed article made of a film having a thin thickness is cut into a predetermined size to thereby obtain a thin film.

Since forming a thin film reduces the film's strength, a raw material for the ethylene-based resin composition that may suppress the reduction of strength is required.

Patent Literature 1 discloses that an ethylene film excellent in forming processability and also excellent in film strength can be provided by setting each of the melt flow rate (190° C., 2.16 kg load), density, the ratio of the melt index (I21: 190° C., 2.16 kg load) to the melt index (I2: 190° C., 2.16 kg load), and melt tension (190° C.) to a specific value.

CITATION LIST

Patent Literature

Patent Literature 1: JP 2018-154803A

SUMMARY OF INVENTION

Technical Problem

As properties required for a film that forms a packaging material, rigidity (e.g., easy opening and self-standability on packaging contents in a packaging material) may be required in some cases, in addition to film strength for the protection of the contents. It is an object of the present invention to provide an ethylene-based resin composition and a film containing the resin composition that may meet these requirements.

Solution to Problem

As a result of intensive studies for achieving the object of the present invention, the present inventors have derived a new finding that allowing an ethylene-based resin composition to have physical properties obtained by appropriately achieving a high molecular weight and narrowing the molecular weight distribution can impart an excellent balance between strength and rigidity to a film containing the ethylene-based resin composition. The present invention has been completed based on the new finding of the present inventors. The present invention is specified by the following articles.

[1] An ethylene-based resin composition satisfying the following requirements (1) to (4):
    (1) a melt flow rate (190° C., 2.16 kg load) is 0.1 g/10 min or more and 1.0 g/10 min or less,
    (2) a density is 915 kg/m$^3$ or more and 935 kg/m$^3$ or less,
    (3) a melt index (I21: 190° C., 21.6 kg load) is 45 or less, and
    (4) a ratio of the amount of heat of fusion at 120° C. or higher (Hh/Ht), which is the ratio of the amount of heat of fusion (Hh) determined from a DSC curve at 120° C. or higher to the total amount of heat of fusion (Ht) determined from a DSC curve of differential scanning calorimetry measurement (DSC measurement), is 10% or more and 55% or less.

[2] The ethylene-based resin composition according to [1], further satisfying the following requirement (5) in addition to the requirements (1) to (4):
    (5) a melt tension at 190° C. is 30 mN or more.

[3] The ethylene-based resin composition according to [1] or [2], wherein the density is 917 kg/m$^3$ or more.

[4] A film including the ethylene-based resin composition according to any one of [1] to [3].

[5] A laminated film having a layer composed of the film according to [4].

Advantageous Effects of Invention

According to the present invention, an ethylene-based resin composition and a film including the resin composition that has an excellent balance between strength and rigidity and physical properties suitable for a packaging material can be provided.

BRIEF DESCRIPTION OF DRAWINGS

The FIGURE is a graph representing the balance between rigidity and strength based on the results obtained in Examples and Comparative Examples.

DESCRIPTION OF EMBODIMENTS

[Ethylene-Based Resin Composition]
An ethylene-based resin composition according to the present invention satisfies the following requirements (1) to (4):
    (1) a melt flow rate (MFR: 190° C., 2.16 kg load) of 0.1 g/10 min or more and 1.0 g/10 min or less;
    (2) a density of 915 kg/m$^3$ or more and 935 kg/m$^3$ or less;
    (3) a melt index (121: 190° C., 21.6 kg load) of 45 or less: and
    (4) a ratio of the amount of heat of fusion at 120° C. or higher (Hh/Ht), which is the ratio of the amount of heat of fusion (Hh) determined from a DSC curve at 120° C. or higher to the total amount of heat of fusion (Ht) determined from a DSC curve of DSC measurement, of 10% or more and 55% or less.

Hereinafter, each of the requirements will be described.

(1) Melt Flow Rate (MFR)

The ethylene-based resin composition according to the present invention has a MFR of 0.1 g/10 min or more and 1.0 g/10 min or less. This MFR value is a value obtained by the measurement at 190° C. and under 2.16 kg load in accordance with JIS K7210.

As existing polyethylene for inflation, from the viewpoint of emphasis on film strength and extrudability, polyethylene having a MFR of 1.0 g/10 min or more and 2.0 g/10 min or less has been used. In the present invention, the MFR is set to a range not more than the lower limit of the existing range described above, from the viewpoint of achievement of an excellent balance between the strength and rigidity of the film as well as the requirements (2) to (4).

The MFR of the ethylene-based resin composition according to the present invention is preferably 0.2 g/10 min or more. Meanwhile, the MFR of the ethylene-based resin composition according to the present invention is preferably 0.9 g/10 min or less, more preferably 0.8 g/10 min or less, and further preferably 0.7 g/10 min or less.

(2) Density

The density of the ethylene-based resin composition according to the present invention, which is a physical property that affects the rigidity of a film, is set within a range of 915 kg/m³ or more and 935 kg/m³ or less, from the viewpoint of achievement of an excellent balance between the strength and rigidity of the film as well as the requirement (1), requirement (3), and requirement (4). The density of the ethylene-based resin composition according to the present invention is preferably 933 kg/m³ or less. The density of the ethylene-based resin composition according to the present invention is preferably 917 g/m³ or more, more preferably 919 kg/m³ or more, and further preferably more than 925 kg/m³.

(3) Melt Index (I21)

The melt index (I21) of the ethylene-based resin composition according to the present invention is set to 45 or less, from the viewpoint of achievement of an excellent balance between the strength and rigidity of the film as well as the requirement (1), requirement (2), and requirement (4). A value of the melt index (I21) is a value obtained by the measurement at 190° C. and under 21.6 kg load in accordance with JIS K7210. The melt index (I21) is more preferably 40 or less, more preferably 35 or less, and further preferably 25 or less. The lower limit of the melt index (I21) is not particularly limited and is preferably 1 or more.

(4) Ratio of the Amount of Heat of Fusion at 120° C. Or Higher (Hh/Ht), which is the Ratio of the Amount of Heat of Fusion (Hh) Determined from a DSC Curve at 120° C. Or Higher to the Total Amount of Heat of Fusion (Ht) Determined from a DSC Curve of DSC Measurement The Hh/Ht of the ethylene-based resin composition according to the present invention represents the amount of the component at 120° C. or higher with respect to the total heat of fusion, and is set in a range of 10% or more and 55% or less, from the viewpoint of achievement of an excellent balance between the strength and rigidity of the film as well as the requirement (1) to requirement (3). The Hh/Ht of the ethylene-based resin composition is preferably set in a range of 15% or more and 50% or less and more preferably set in a range of 20% or more and 45% or less.

(5) Melt Tension

The melt tension at 190° C., as the evaluation criterion of the heat resistance of the ethylene-based resin composition according to the present invention, is preferably 30 mN or more, that is, at least 30 mN.

The melt tension is measured by the method described below.

An ethylene-based polymer as a resin component to be contained in the ethylene-based resin composition according to the present invention may be a homopolymer of ethylene or may be an ethylene-based copolymer of ethylene and another monomer. As the ethylene-based copolymer, a copolymer of ethylene and an α-olefin having 3 or more carbon atoms (ethylene-α-olefin copolymer) is particularly preferred. Specific examples of the α-olefin in the ethylene-α-olefin copolymer include propylene, butene, 1-octene, and 1-hexene. Among these examples, 1-hexene and 1-octene are preferable, and 1-hexene is more preferable. Such copolymers can be manufactured using a known catalyst such as a Ziegler-Natta catalyst and a metallocene catalyst. As a resin component, another low-density polyethylene may be used in addition to the copolymer of ethylene and an α-olefin. In the present invention, one or a combination of two or more resins containing an ethylene-based polymer satisfying the above-mentioned properties can be selected from commercially available polyethylene-based resins and used as a resin component. An example of the polyethylene-based resin containing the ethylene-α-olefin copolymer can include linear low-density polyethylene.

The ethylene-based resin composition according to the present invention may contain, if needed, at least one of various additives such as a weathering stabilizer, a heat-resistant stabilizer, an antistatic agent, an antifogging agent, an anti-blocking agent, a slipping agent, a lubricant, a pigment, and an antisticking agent which are commonly added to a polyolefin-based resin composition, insofar as the object of the present invention is not impaired.

<Film>

By use of the ethylene-based resin composition according to the present invention, a film that has an excellent balance between strength and rigidity and is suitable for a packaging material, etc., can be provided. Examples of the film can include films in the forms as follows.

(A) A single-layer film or laminated film containing the ethylene-based resin composition according to the present invention.

(B) A laminated film including at least one of layers containing the ethylene-based resin composition according to the present invention and at least one of layers containing, as the resin component, a material other than the ethylene-based resin composition according to the present invention.

An example of a layer structure of the laminated film in the form (A) described above can include a multilayer structure that has at least one or more combinations of 2 layers each containing a different ethylene-based resin composition.

In the case of using a plurality of layers containing the ethylene-based resin composition according to the present invention in the form (B) described above, these layers may be the same or different or may have one or more combinations of different layers. Similarly, in the case of using a plurality of layers containing other materials, these layers may be the same or different or may have one or more combinations of different layers.

Examples of the layer structure of the laminated film of the form (B) described above include layer structures as follows.

(a) A layer structure in which a layer containing the ethylene-based resin composition according to the present invention is laminated on one or both sides of a layer containing other materials.

(b) A layer structure obtained by lamination with a layer containing the ethylene-based resin composition according to the present invention sandwiched between two layers containing other materials.

Some of the layers constituting the laminated film may have a function as a substrate.

Examples of other materials for a laminated film can include sheets or film composed of a thermoplastic resin, paper, and aluminum foil. As the thermoplastic resin, one selected from known thermoplastic resins by the application of the laminated film may be used. Specific examples of the thermoplastic resin include polyolefins [polyethylenes such as high-pressure low-density polyethylene, linear low-density polyethylene (LLDPE: ethylene-α-olefin random copolymer), medium-density polyethylene, and high-density polyethylene; polypropylenes such as propylene homopolymer and propylene-α-olefin random copolymer (propylene random copolymer); poly methyl-pentene; and polybutene], polyesters (such as polyethylene terephthalate, polybutylene terephthalate, and polyethylene naphthalate), polyamides (such as nylon-6, nylon-66, and poly(m-xylene adipamide)), polyvinyl chloride, polyimide, ethylene-vinyl acetate copolymer or a saponified product thereof, polyvinyl alcohol, polyacrylonitrile, polycarbonate, polystyrene, and ionomers, or mixtures of two or more of these, for example. Among these examples, thermoplastic resins having favorable stretchability and transparency such as polypropylene, polyethylene terephthalate, and polyamide are preferable.

A thermoplastic resin film, as the other materials described above, may be a non-stretched film or stretched film. This thermoplastic resin film may be a laminate obtainable by, for example, coextrusion forming, extrusion lamination, dry lamination, and thermal lamination of one or two or more thermoplastic resins. Among these, in the case of using a thermoplastic resin film as the substrate, a biaxially stretched thermoplastic film, particularly a biaxially stretched thermoplastic film composed of polypropylene, polyethylene terephthalate, and/or polyamide is preferable.

The thickness of the film (layer) containing the ethylene-based resin composition according to the present invention may be appropriately determined depending on desired applications and can be selected usually in the range of 5 to 200 μm, preferably 20 to 180 μm.

As the evaluation criterion for the strength of the film containing the ethylene-based resin composition according to the present invention, the dart impact of a single-layer film having a thickness of 40 μm is 221 g or more, that is, preferably at least 221 g. When the dart impact is 221 g or more, the film has sufficient strength, and when the film is applied to a packaging material such as a packaging bag, the bag can be prevented from being broken during transport or dropping.

As the evaluation criterion for the rigidity of the film containing the ethylene-based resin composition according to the present invention, the MD elastic modulus of a single-layer film having a thickness of 40 μm is 283 MPa or more, that is, preferably at least 283 MPa. When the MD elastic modulus is 283 MPa or more, the film has sufficient rigidity, and when the film is applied to a packaging material such as a packaging bag, favorable easy opening, and self-standability on packaging contents in the packaging material can be imparted to the packaging material. In contrast, the upper limit of the MD elastic modulus is not particularly limited and is preferably set to 5000 MPa or less due to a manufacturing method.

<Film Forming Method>

The ethylene-based resin composition according to the present invention can be formed into a film by a known melt extrusion forming method etc. As this melt extrusion forming method, a known method can be adopted without any limitation. In the case of using the film in a packaging material application, the resin composition is preferably formed into a film by inflation forming. The thus obtained film may be used as it is as a non-stretched film or may be further stretched and used as a stretched film to be processed into a film for manufacturing of a packaging material such as a bag for food packaging. In this case, the thickness of the film obtained by melt extrusion forming (referred to as an original film to be stretched, including a thick formed product which is referred to as a sheet depending on the thickness) varies depending on the forming method. The thickness of an original film to be stretched is preferably 90 μm to 1000 μm, and more preferably 100 μm to 900 μm, in the case of being produced by inflation forming.

A cooling method of a molten resin may be air cooling or water cooling. Then, stretching the original film to be stretched in the longitudinal direction or both in the longitudinal and width directions enables a stretched film to be obtained.

In the case of a laminate film having a film containing the ethylene-based resin composition according to the present invention and a film composed of other materials, a multilayer original film to be stretched which is obtained by coextrusion forming these materials using a multilayer die can be used as the raw material for a packaging material.

Methods for thinning an original film to be stretched by stretching the film include, for example, a method of biaxial stretching in the longitudinal and width directions simultaneously or sequentially by tenter method, a method of biaxial stretching in the longitudinal and width directions simultaneously by tubular method, or a method of uniaxial stretching in a flow direction of the film by utilizing a ratio of rotational speeds of two or more rolls.

The film according to the present invention is suitable for applications including various films for packaging such as a bag for a water-containing product, a bag for liquid soup packaging, a paper container for liquid, an original film to be laminated, a special-shaped bag for liquid packaging (such as a standing pouch), a standard bag, a heavy duty bag, a wrap film, a sugar bag, a bag for an oil-containing product, and food packaging; and clean films used for a protective film, an infusion solution bag, an agricultural material, a bag-in-box, and packaging of semiconductor materials, pharmaceutical products, and food.

The film according to the present invention has excellent low-temperature heat-sealability, enabling heat sealing at a desired peel strength to be made over a wide temperature range.

The film according to the present invention can have an excellent balance between heat resistance and impact resistance in addition to the balance between rigidity and strength. Thus, the film is not susceptible to defects even when exposed to a high temperature and is unlikely to be broken even when subjected to an impact. Accordingly, the film according to the present invention is particularly useful in various applications in which heat resistance and impact resistance are required, such as food and medical fields. Specifically, the film according to the present invention can be suitably used particularly for packaging materials for liquid or solid objects to be packaged that require a heatsterilization treatment, such as retort foods, pharmaceutical products, medical devices, and pet foods.

EXAMPLES

Hereinafter, the present invention will be described in detail with reference to Examples and Comparative Examples. However, the present invention is not limited to these Examples.

Ethylene-based resin compositions as follows were used as resin components in Examples and Comparative Examples.

Ethylene-1-hexene copolymer (trade name: EVOLUE SP1510, manufactured by Prime Polymer Co., Ltd., MFR (190° C., 2.16 kg load): 1.0 g/10 min, density: 915 kg/m³)

Ethylene-1-hexene copolymer (trade name: EVOLUE SP2020, manufactured by Prime Polymer Co., Ltd., MFR (190° C., 2.16 kg load): 2.3 g/10 min, density: 916 kg/m³)

Ethylene-1-hexene copolymer (trade name: EVOLUE SP2520, manufactured by Prime Polymer Co., Ltd., MFR (190° C., 2.16 kg load): 1.9 g/10 min, density: 925 kg/m³)

Ethylene-1-hexene copolymer (trade name: EVOLUE SP3210, manufactured by Prime Polymer Co., Ltd., MFR (190° C., 2.16 kg load): 0.58 g/10 min, density: 929 kg/m³)

Ethylene-1-hexene copolymer (trade name: EVOLUE SP2090C, manufactured by Prime Polymer Co., Ltd., MFR (190° C., 2.16 kg load): 9.0 g/10 min, density: 920 kg/m³)

The melt flow rate (MFR), melt index (I21), density (D), amount of the component at 120° C. or higher in DSC (Hh/Ht), MD and TD elastic moduli, and melt tension (190° C.) were measured according to the following methods, in the following Examples and Comparative Examples.

<Melt Flow Rate (MFR: [g/10 min])>

The melt flow rate was measured under conditions of 190° C. and 2.16 kg load (kgf) in accordance with JIS K7210.

<Melt Index (I21)>

The melt index (I21) was measured at 190° C. and under 21.6 kg load in accordance with JIS K7210.

<Density [kg/m³]>

The strand obtained in the measurement of the MFR was heat-treated at 100° C. for 1 hour, left at room temperature for an additional 1 hour, and then the density was measured by the density gradient tube method in accordance with JIS K7112.

<Dart Impact [g]>

The dart impact was measured under the following conditions in accordance with ASTM D1709.

A specimen (40 μm in thickness) is clamped with a pneumatic clamping system, a hemispherical dart is dropped from a fixed height, and the load [g] at which 50% of the specimen is broken is read out from a graph. The number of times dropping was 10 times at one level, and Method A was used.

<Hh/Ht>

The ratio of the amount of heat of fusion of the resin component constituting the film was determined by calculated as a ratio of the amount of heat of fusion at 120° C. or higher (Hh/Ht), which is the ratio representing the amount of the component at 120° C. or higher, from the total amount of heat of fusion (Ht) determined from a DSC curve and the amount of heat of fusion (Hh) determined from a DSC curve at 120° C. or higher of DSC measurement.

<Elastic Modulus>

A dumbbell having a size in accordance with JIS K6781 punched from a film was used as a punched specimen. The case of punching in parallel with the take-off direction of the film is referred to as a MD (machine direction), and the case of punching in the direction perpendicular to the take-off direction of the film is referred to as a TD (transverse direction). The specimen was set up in air chucks of a universal tester and subjected to a tensile test with a chuck distance set to 80 mm and a pulling rate set to 200 mm/min. The slope of the initial stress to the displacement was taken as the elastic modulus.

<Melt Tension (190° C.) [mN]>

The melt tension (190° C.) at 190° C. was determined by measuring the stress when the specimen was stretched at a constant speed. A capillary rheometer: CAPILOGRAPH 1B manufactured by Toyo Seiki Seisaku-sho, Ltd. was used for the measurements. The conditions were as follows: resin temperature 190° C., melting time 6 minutes, barrel diameter 9.55 mmφ, extrusion speed 15 mm/min, winding speed 24 m/min (when the molten filament was broken, winding speed was reduced with an increment of 5 m/min), nozzle diameter 2.095 mmφ, and nozzle length 8 mm.

<Inflation Formability>

The inflation formability was evaluated by visually confirming that bubbles were stabilized without swaying on the formation.

Examples 1 to 3 and Comparative Examples 1 to 3

The MFR, melt index (I21), density, amount of the component at 120° C. or higher in DSC (Hh/Ht), and melt tension (190° C.) were measured with regard to the ethylene-based resin compositions of each brand shown in Table 1 and Table 2, singly or as a mixture of two (the total amount of two was taken as 100% by mass).

Further, (non-stretched) films having a thickness of 40 μm and a folded width of 320 mm were manufactured by air-cooling inflation forming of each of the ethylene-based resin compositions under the forming conditions below.

Forming Conditions

Forming machine: 50 mmφ inflation forming machine manufactured by Modern Machinery Co., Inc.

Screw: barrier-type screw

Die: 100 nmφ (diameter), 3.5 mm (lip width)

Air ring: 2-gap type

Forming temperature: 200° C.

Extrusion rate: 28.8 kg/h

Take-off speed: 20 m/min

The inflation formability during the air-cooling inflation forming described above was evaluated. Further, the films thus obtained were further subjected to measurement of elastic moduli (MD and TD) and dart impact.

The results obtained are shown in Table 1 and Table 2. The balance between rigidity and strength based on the results of the MD elastic modulus and dart impact shown in Table 1 and Table 2 is shown in the FIGURE.

TABLE 1

| | | Unit | Example 1 SP3210 | Example 2 SP3210 70% SP1510 30% | Example 3 SP3210 30% SP1510 70% |
|---|---|---|---|---|---|
| Resin composition physical properties | MFR | g/10 min | 0.58 | 0.57 | 0.9 |
| | Density | kg/m³ | 929 | 926 | 918 |
| | I21 | g/10 min | 19 | 19 | 18 |
| | Amount of component at 120° C. or higher in DSC (Hh/Ht) | % | 43 | 34 | 22 |
| | Melt tension (190° C.) | mN | 65 | 50 | 33 |
| Film physical properties | Film thickness | μm | 40 | 40 | 40 |
| | Elastic Modulus MD | MPa | 590 | 471 | 317 |
| | TD | MPa | 835 | 665 | 402 |
| | Dart impact | g | 290 | 670 | 1500 |
| | Inflation formability (bubble stability) | — | Favorable | Favorable | Favorable |

TABLE 2

| | | Unit | Comparative Example 1 SP2020 | Comparative Example 2 SP2520 | Comparative Example 3 SP2090C |
|---|---|---|---|---|---|
| Resin composition physical properties | MFR | g/10 min | 2.3 | 1.9 | 9.0 |
| | Density | kg/m³ | 916 | 925 | 920 |
| | I21 | g/10 min | 53 | 49 | — |
| | Amount of component at 120° C. or higher in DSC (Hh/Ht) | % | 1.4 | 29 | 27 |
| | Melt tension (190° C.) | mN | 71 | 48 | 21 |
| Film physical properties | Film thickness | μm | 40 | 40 | 40 |
| | Elastic Modulus MD | MPa | 282 | 453 | 337 |
| | TD | MPa | 389 | 619 | 476 |
| | Dart impact | g | 548 | 220 | 137 |
| | Inflation formability (bubble stability) | — | Favorable | Favorable | Unstable |

As shown in Table 1, in Examples 1 to 3, which satisfy the requirements (1) to (4), a dart impact of 290 g or more and a MD elastic modulus of 317 MPa or more have been achieved. Thus, it was able to obtain polyethylene-based resin films that have sufficient strength and rigidity in an excellent balance and are suitable as packaging materials. Further in Examples 1 to 3, the melt tension has satisfied the evaluation criterion of 30 mN or more, in addition to the dart impact. In these Examples, it was able to obtain polyethyl-ene-based resin films that have sufficient heat resistance and impact resistance in a well-balanced manner and are suitable as packaging materials.

In contrast, as shown in Table 2, in Comparative Example 1, in which the MFR and melt index (I21) are higher than the ranges specified in the requirement (1) and requirement (2), respectively, and Hh/Ht is lower than the range specified in the requirement (4), a sufficient value has been achieved in the dart impact, but the MD elastic modulus is as low as 282 MPa, and thus a favorable balance between strength and rigidity could not be obtained. Meanwhile, in Comparative Example 2, in which the MFR and melt index (I21) are higher than the ranges specified in the requirement (1) and requirement (2), respectively, a sufficient value has been achieved in the MD elastic modulus, but the dart impact is as low as 220 g, and thus a favorable balance between strength and rigidity could not be obtained. Additionally, in Comparative Example 3, in which the MFR is markedly higher than the range specified in the requirement (1), the evaluation criteria in the dart impact and melt tension have not been satisfied, and the inflation formability also was evaluated as "unstable", and thus the intended physical properties in Examples 1 to 3 could not be achieved.

INDUSTRIAL APPLICABILITY

According to the present invention, an ethylene-based resin composition and a film containing the resin composi-tion that has a favorable balance between strength and rigidity and which is useful for a packaging material can be provided.

The invention claimed is:

1. An ethylene-based resin composition satisfying the following requirements (1) to (5):

(1) a melt flow rate (190° C., 2.16 kg load) is 0.1 g/10 min or more and 1.0 g/10 min or less, (2) a density is 915 kg/m3 or more and 935 kg/m3 or less, (3) a melt index (I21:190° C., 21.6 kg load) is 45 or less, (4) a ratio of the amount of heat of fusion at 120° C. or higher (Hh/Ht), which is the ratio of the amount of heat of fusion (Hh) determined from a DSC curve at 120° C.

or higher to the total amount of heat of fusion (Ht) determined from a DSC curve of differential scanning calorimetry measurement (DSC measurement), is 15% or more and 55% or less; and (5) a melt tension at 190° C. is 30 mN or more and 50 mN or less.

2. The ethylene-based resin composition according to claim 1, wherein the density is 917 kg/m3 or more.

3. A film comprising the ethylene-based resin composition according to claim 1.

4. A laminated film having a layer composed of the film according to claim 3.

\* \* \* \* \*